US012680791B2

(12) United States Patent
Glick

(10) Patent No.: US 12,680,791 B2
(45) Date of Patent: Jul. 14, 2026

(54) BULLET RESISTANT GARAGE DOOR ASSEMBLY WITH A SHELL FORMED FROM COIL STOCK

(71) Applicant: Amos B. Glick, Gap, PA (US)

(72) Inventor: Amos B. Glick, Gap, PA (US)

( * ) Notice: Subject to any disclaimer, the term of this patent is extended or adjusted under 35 U.S.C. 154(b) by 0 days.

(21) Appl. No.: 18/920,614

(22) Filed: Oct. 18, 2024

(65) Prior Publication Data

US 2025/0044063 A1 Feb. 6, 2025

Related U.S. Application Data

(63) Continuation-in-part of application No. 17/941,940, filed on Sep. 9, 2022, now Pat. No. 12,123,685.

(51) Int. Cl.
*F41H 5/24* (2006.01)
*E06B 5/10* (2006.01)

(52) U.S. Cl.
CPC *F41H 5/24* (2013.01); *E06B 5/10* (2013.01)

(58) Field of Classification Search
CPC ........ F41H 5/226; F41H 5/045; E06B 3/7015; E06B 5/10; E06B 2003/7023; E06B 2003/7044; E06B 2003/7051
USPC ........................................................ 89/36.04
See application file for complete search history.

(56) References Cited

U.S. PATENT DOCUMENTS 1,899,735 A 2/1933 McClintock
5,429,340 A 7/1995 Young
8,001,880 B2 * 8/2011 White ........................ F41H 5/24 404/6
10,012,479 B2 * 7/2018 Boviall ...................... F41H 5/24
10,281,245 B2 * 5/2019 DeKort ...................... F41H 5/24
10,407,976 B1 * 9/2019 Kelley .................. E06B 3/7015
10,676,982 B1 * 6/2020 Harris ..................... E06B 3/485
11,814,896 B1 * 11/2023 Velazquez ................. E06B 9/04
2009/0241422 A1 * 10/2009 Mock .................... E06B 3/5892 52/204.53
2012/0090452 A1 * 4/2012 Sudhakar .............. F41H 5/0457 70/237
2015/0354926 A1 * 12/2015 Gibson .................... F41J 11/00 89/36.04

(Continued)

OTHER PUBLICATIONS

"Bulletstop Bullet Proof Door" by Thermostop; product brochure (Year: 2025).*

(Continued)

*Primary Examiner* — Samir Abdosh
(74) *Attorney, Agent, or Firm* — Miller Law Group, PLLC

(57) ABSTRACT

A ballistic garage door assembly and a kit for converting a standard garage door includes metal shell panels formed from coil stock metal that uses sheets of ballistic material secured to each metal shell panel. Joint inserts applied to the horizontal ends of the garage door panels provide bullet resistant characteristics at the joints. Ballistic sheets of compressed multiple plies of ballistic material, hardened ballistic resin, or bullet resistant metal barriers, are applied to each garage door shell. Increased levels of ballistic protection will utilize thicker ballistic sheets and increased thickness of the walls of the joint inserts, and optionally an additional external ballistic bumper to increase ballistic performance of the joints between the garage door panels. The outward aesthetic appearance of the garage door does not change appreciably.

16 Claims, 6 Drawing Sheets

(56) References Cited

U.S. PATENT DOCUMENTS

| | | | | |
|---|---|---|---|---|
| 2018/0266172 | A1* | 9/2018 | Wray | E05D 15/22 |
| 2021/0088314 | A1* | 3/2021 | Azhagesan | F41H 5/226 |
| 2021/0302130 | A1* | 9/2021 | Glick | F41H 5/013 |
| 2022/0390211 | A1* | 12/2022 | Adrain | E06B 9/382 |
| 2023/0184518 | A1* | 6/2023 | Glick | E06B 3/485<br>89/36.01 |
| 2023/0304774 | A1* | 9/2023 | Adrain | B32B 27/12 |
| 2023/0408226 | A1* | 12/2023 | Giordano | F41H 5/24 |

OTHER PUBLICATIONS

"Violentum 1 | Violentum 2" by Bullistic Barriers, product page—https://bullisticbarriers.com/security-bullet-resistant-garage-doors/high-security-garage-doors/ (Year: 2025).*

* cited by examiner

Fig. 2
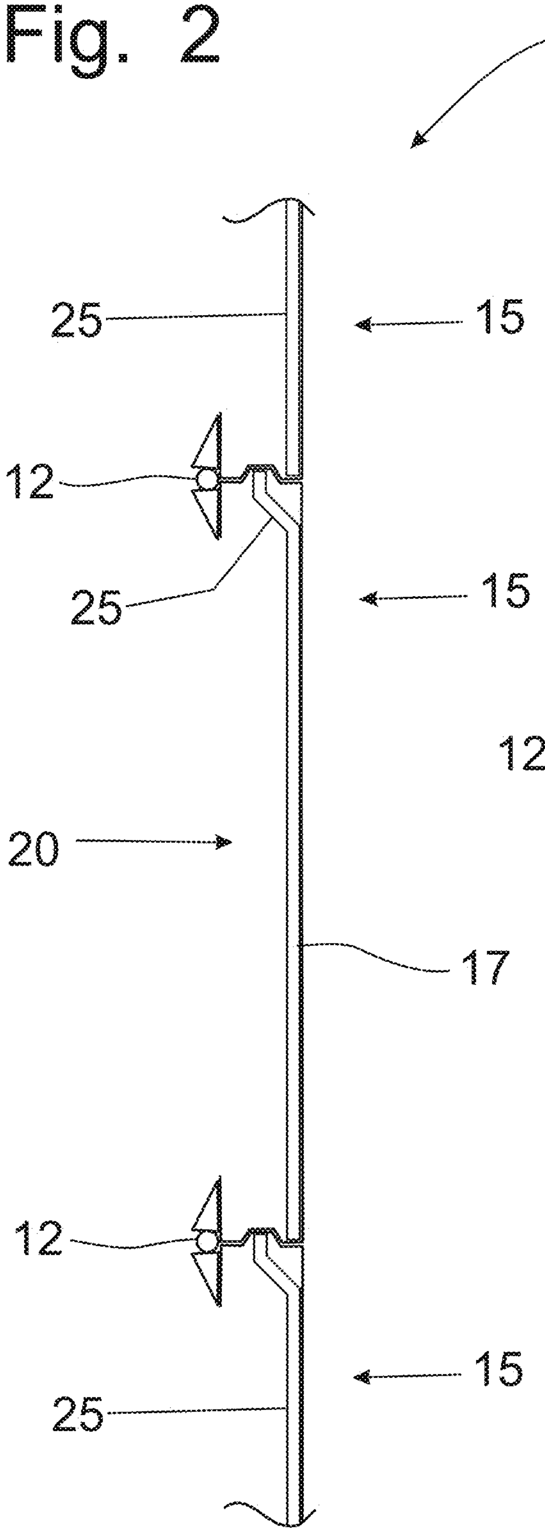
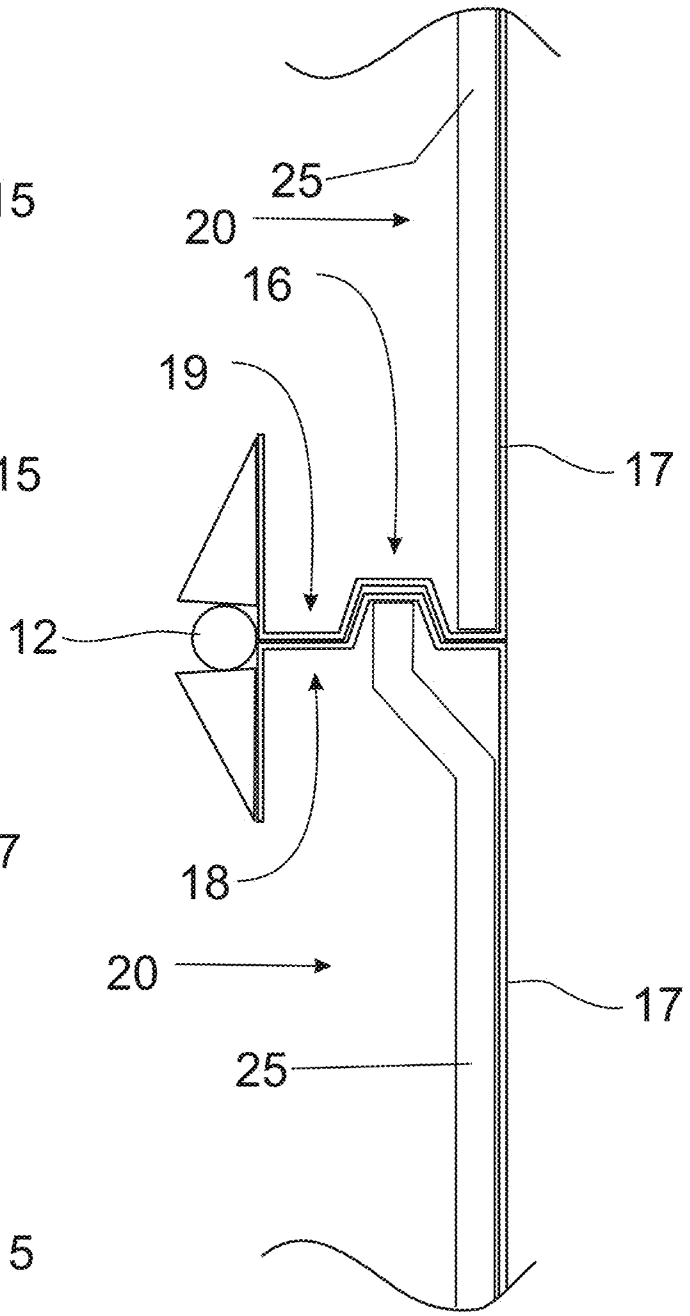
Fig. 3

Fig. 5
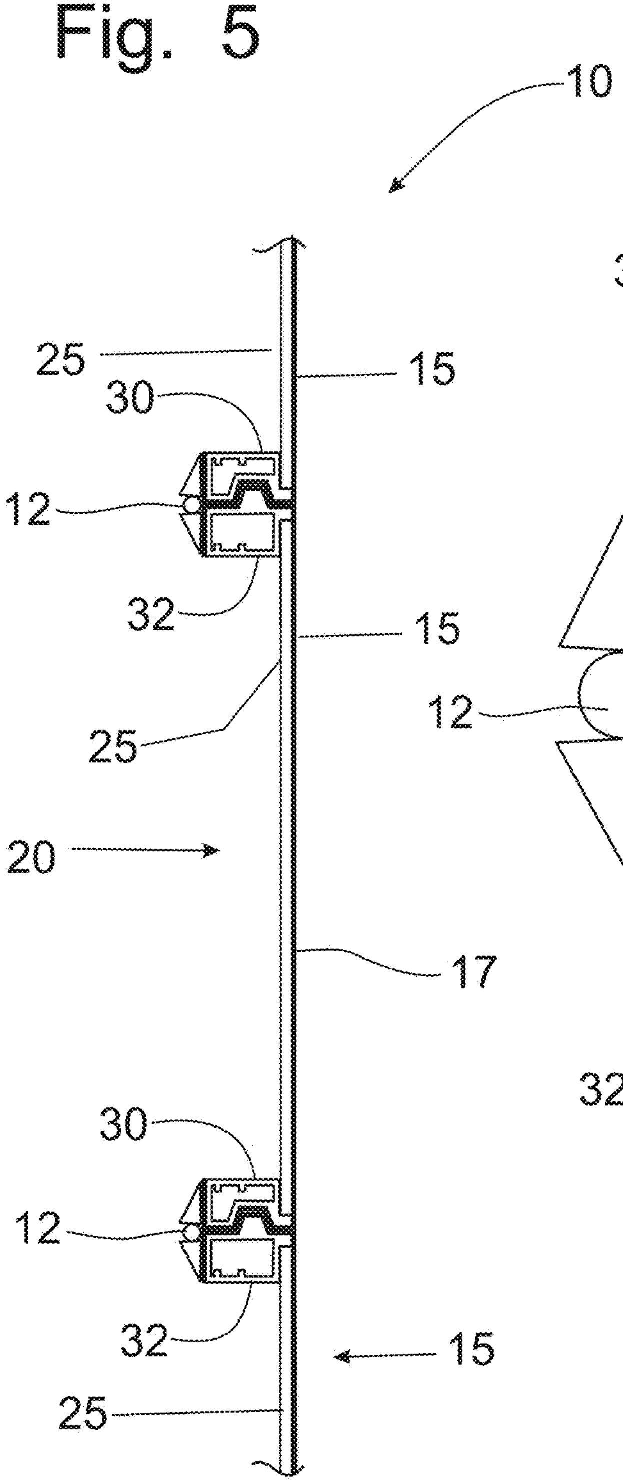
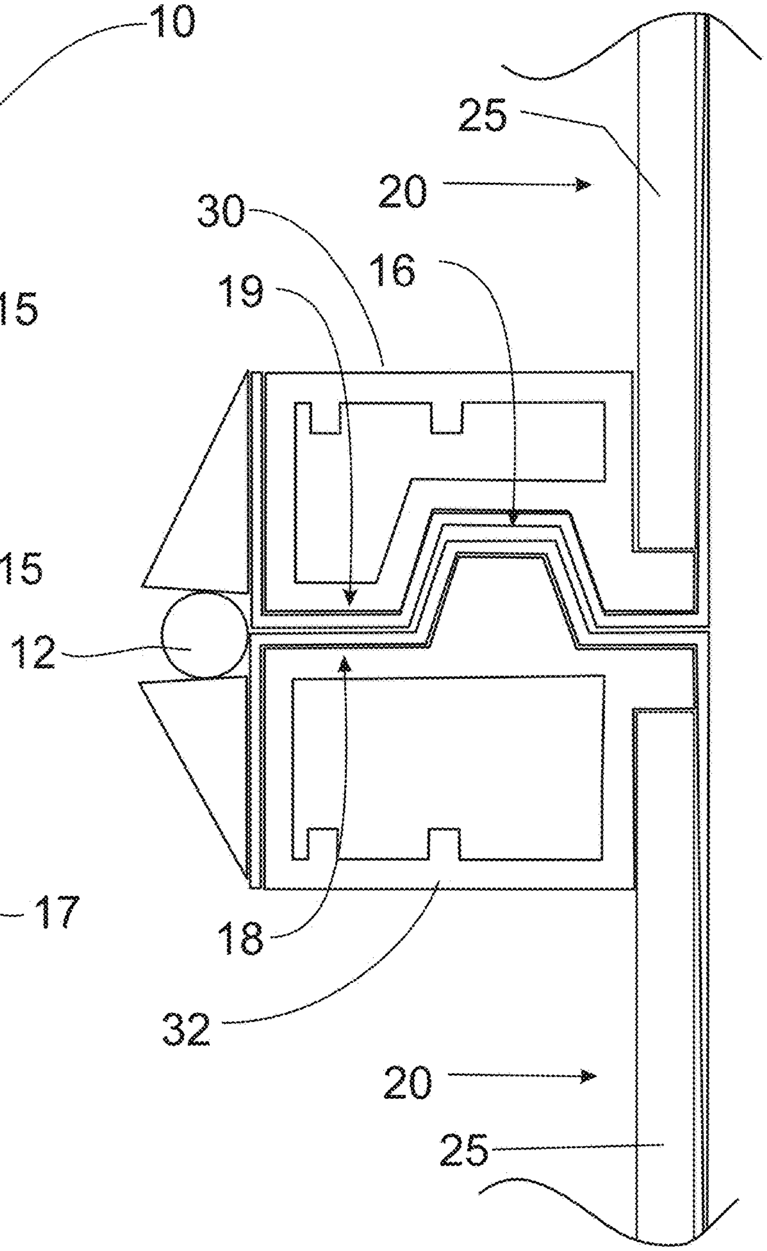
Fig. 6

Fig. 8
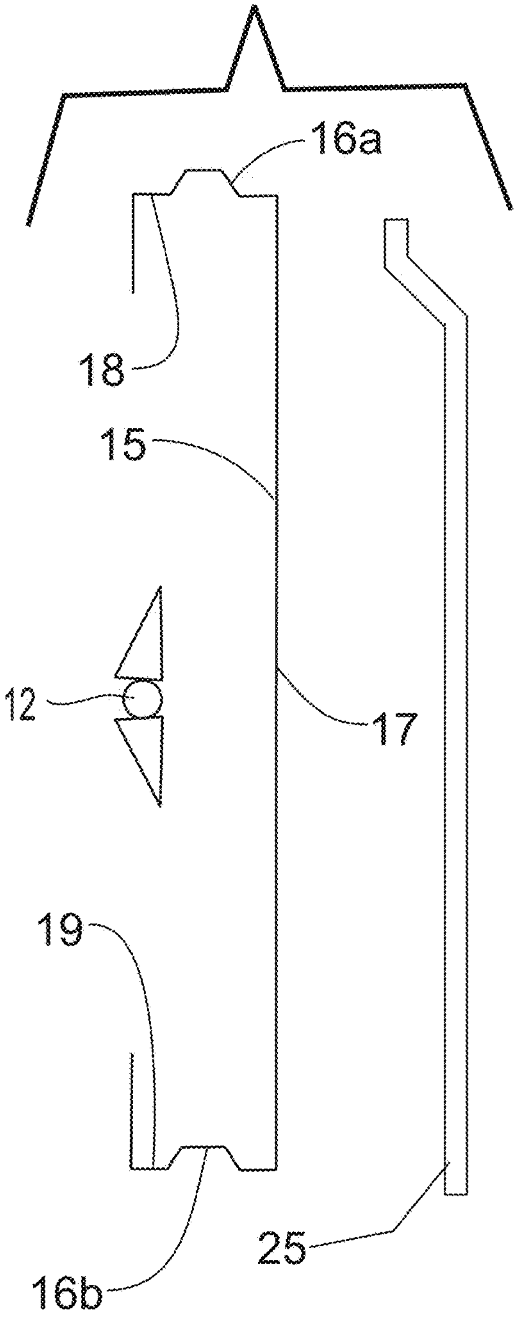
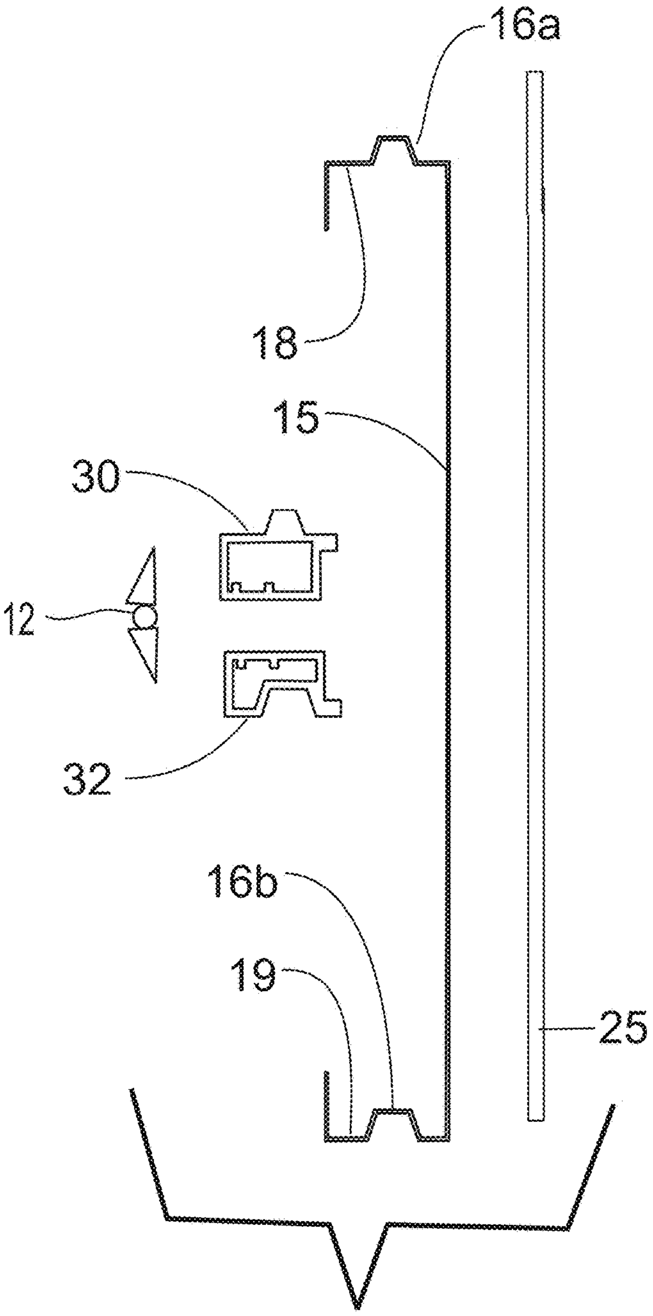
Fig. 9

BULLET RESISTANT GARAGE DOOR ASSEMBLY WITH A SHELL FORMED FROM COIL STOCK

CROSS-REFERENCE TO RELATED APPLICATIONS

This application is a continuation-in-part application claiming priority on U.S. patent application Ser. No. 17/941,940, filed on Sep. 9, 2022, which in turn is a continuation-in-part of U.S. patent application Ser. No. 17/207,417, filed on Mar. 19, 2021, which in turn claims domestic priority on U.S. Provisional Patent Application Ser. No. 62/994,040, filed on Mar. 24, 2020, the contents of all of which are incorporated herein by reference.

FIELD OF THE INVENTION

This invention relates generally to a garage door providing security for property and occupants behind the garage door and, more particularly, to a bullet resistant garage door utilizing a shell formed from coil stock which configuration resists penetration through the garage door of bullets up to a predetermined caliber of bullet.

BACKGROUND OF THE INVENTION

Ballistic barriers have been designed and provided to resist and/or prevent the passage of bullets fired at the barrier. Such ballistic barriers have been used at indoor shooting ranges, as security fences for residences and commercial property and other establishments, and as shields for individuals advancing under fire. Ballistic barriers are typically formed of bullet resistant metal and are heavy and difficult to use because of that weight. As security fence structures, the weight of the panels are difficult to install and to maintain.

In U.S. Pat. No. 1,899,735, granted on Jan. 22, 1932, to O. B. McClintock, a security barrier for bank tellers is disclosed in which the barrier is formed from a metal shell supporting bullet resistant glass and a complex structure to provide protection for a bank teller. A modular security fence is disclosed in U.S. Pat. No. 5,429,340, granted on Jul. 4, 1995, to Anthony M. Young, et al, in which the security fence is formed from overlapping panel modules. Each module is formed as an irregularly shaped open shell that interlocks with one or more adjoining modules or shells. Ballistic resistance is a result of opposing outer walls of the open shells when assembled together.

A ballistic barrier is disclosed in U.S. Pat. No. 8,001,880, granted to William C. White, et. al., on Aug. 23, 2011, wherein a lower barrier supports attack resistant panes extending upwardly from the barrier. The lower barrier provides protection from vehicle crashes, while the upper attack resistant panes are formed from material, such as plastic, acrylic and polycarbonates, among others, to resist penetration by bullets, particularly rounds fired by handguns. The ballistic wall structures disclosed in U.S. Patent Publication No. 2015/0354926, published on Dec. 10, 2015, by MGM Holdings, LLC, are designed for use in shooting ranges. The intent of this ballistic wall structure is to retain bullets within the wall structure. A ballistic curtain formed of ballistic rubber allows the passage of a bullet, while slowing the speed of the bullet so that the inner plate 54 stops the penetration of the bullet. The rubber curtain also prevents ricochets and fragments from passing back through the curtain.

Another ballistic barrier is disclosed in U.S. Pat. No. 10,012,479, granted to Michael Boviall on Jul. 3, 2018. This ballistic barrier is formed by a wall incorporating louvers or slats angled and overlapping to provide resistance to the passage of bullets by deflecting the path of the bullets downwardly to the ground. IN an alternative embodiment, the angled slats are backed by a backer plate that serves to further deflect the path of the bullets. A ballistic barrier designed to be portable in discrete panels and assembled in a selected location is disclosed in U.S. Pat. No. 10,281,245, granted on May 7, 2019, to Michael J. DeKort. Each panel can be connected to adjoining panels by hinges, and can, thereby, be folded for portability. Each panel is formed with a single pane of solid metal to provide bullet resistance.

Security doors have also been designed to resist bullet penetration, as can be seen in the security door configuration disclosed in U.S. Pat. No. 9,200,480, granted on Dec. 1, 2015 to Alan P. Deiler. In this Deiler patent, the security door is simply formed with an interior core of steel to resist bullet penetration. If a garage door were constructed according to this disclosed configuration, the garage door would have a tendency for bullets to ricochet from the door, rather than to absorb the energy carried by the bullet striking the garage door. The ricocheting bullet can provide a dangerous situation to other people and property near the garage door being struck by the bullet. As one skilled in the art would readily recognize, allowing a bullet to ricochet is not a desirable performance.

Accordingly, it would be desirable to provide a bullet resistant garage door structure utilizing a shell formed from coil stock metal that can absorb energy from a bullet striking the garage door without allowing the bullet to penetrate the structure of the garage door, at least being effective to resist the passage of bullets therethrough up to a predetermined caliber of weapon.

SUMMARY OF THE INVENTION

It is an object of this invention to overcome the disadvantages of the prior art by providing a kit for transforming a standard garage door into a bullet resistant garage door.

It is a feature of this invention that a garage door formed from a thin sheet of coil stock steel or aluminum can be converted into a bullet resistant garage door.

It is an advantage of this invention that the exterior panel formed from a coil stock metal will allow penetration of a bullet while dissipating most of the kinetic energy of the bullet by a layer of bullet resistant material so that bullet under a certain caliber cannot penetrate into the interior of the garage.

It is a feature of this invention that the standard garage door shell formed from coil stock metal has attached thereto a bullet resistant panel formed from an aluminum panel or from compressed bullet resistant fabric to prevent penetration of bullets under a certain caliber.

It is another advantage of this invention that the ballistic material can be multiple plies of ballistic fabric compressed into a sheet, or hardened ballistic resin, or other known ballistic material that can be secured to the panel shell formed from coil stock metal.

It is still another object of this invention to provide a kit to convert a standard garage door configuration into a garage door with bullet resistant characteristics at the joints between vertically spaced garage door panels.

It is still another advantage of this invention that the small gaps between the respective garage door panels are provided with bullet resistant inserts that make the joints between adjacent garage door panels bullet resistant.

It is still another feature of this invention that the joint between adjacent exterior aluminum panels can be covered by a shield that enhances the bullet resistant characteristics of the garage door configuration.

It is yet another feature of this invention that the shield extends below the corresponding exterior aluminum panel to provide bullet resistant characteristics for the garage door as the garage door is being raised to open and adjacent garage door panels pivot relative to one another.

It is still another feature of this invention that the installation of the kit to convert a standard garage door into a bullet resistant garage door does not disturb the exterior outward appearance for the garage door while providing bullet resistant characteristics.

It is another feature of this invention that the ballistic inserts placed behind the exterior shell of the standard garage door can be attached to the exterior shell with a very high bonding adhesive tape.

It is yet another feature of this invention to provide a garage door panel shell formed from coil stock metal and extrusion members at the joints between the panels that provide bullet resistant characteristics.

It is a further object of this invention to provide a standard garage door configuration having panel shells formed from coil stock meter with bullet resistant materials secured to the panel shell to provide a bullet resistant garage door that is durable in construction, carefree of maintenance, easy to assemble, and simple and effective in use.

These and other objects, features and advantages are accomplished according to the instant invention by providing a ballistic garage door assembly and a kit for converting a standard garage door includes metal shell panels formed from coil stock metal that uses sheets of ballistic material secured to each metal shell panel. Joint inserts applied to the horizontal ends of the garage door panels provide bullet resistant characteristics at the joints. Ballistic sheets of compressed multiple plies of ballistic material, hardened ballistic resin, or bullet resistant metal barriers, are applied to each garage door shell. Increased levels of ballistic protection will utilize thicker ballistic sheets and increased thickness of the walls of the joint inserts, and optionally an additional external ballistic bumper to increase ballistic performance of the joints between the garage door panels. The outward aesthetic appearance of the garage door does not change appreciably.

BRIEF DESCRIPTION OF THE DRA WINGS

The advantages of this invention will become apparent upon consideration of the following detailed disclosure of the invention, especially when taken in conjunction with the accompanying drawings wherein:

FIG. 2 is a cross-sectional view of the garage door taken along lines 2-2 of FIG. 1 and forming a bullet resistant garage door configuration having panel shells formed from coil stock metal;

FIG. 3 is an enlarged cross-sectional view of a joint between two panel shells as shown in FIG. 2;

FIG. 5 is a cross-sectional view of an alternative garage door configuration taken along lines 2-2 of FIG. 1;

FIG. 6 is an enlarged cross-sectional view of a joint between two garage door panels as shown in FIG. 5;

FIG. 8 is an exploded view of the components of a panel shell of the garage door configuration shown in FIG. 2; and FIG. 9 is an exploded view of the components of a panel shell of the garage door configuration shown in FIG. 5.

DETAILED DESCRIPTION OF THE PREFERRED EMBODIMENT

Figure 1:
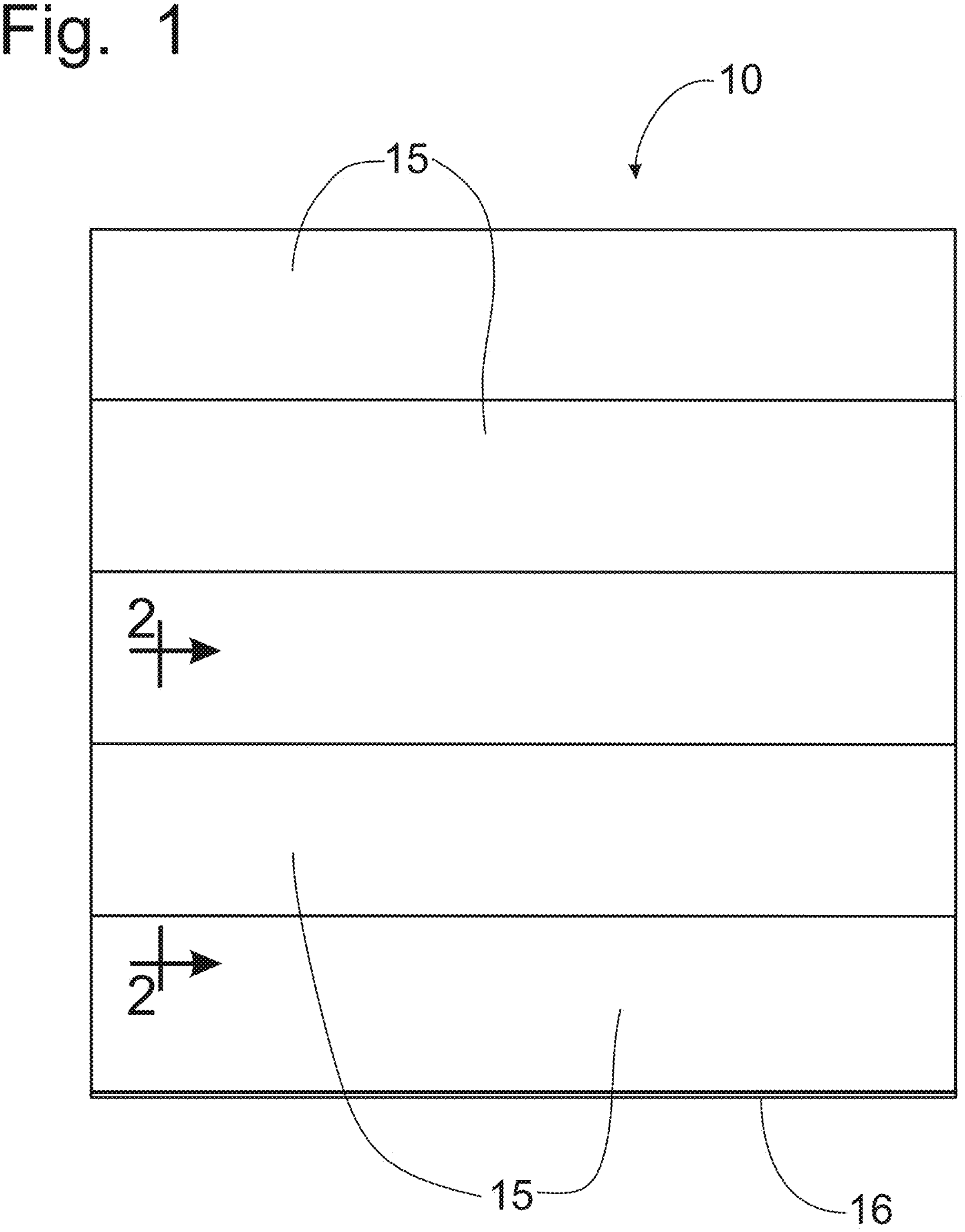
FIG. 1 is a schematic front elevational view of a conventional garage door transformed into a bullet resistant security garage door in a closed orientation and incorporating the principles of the instant invention.
Figure 4:
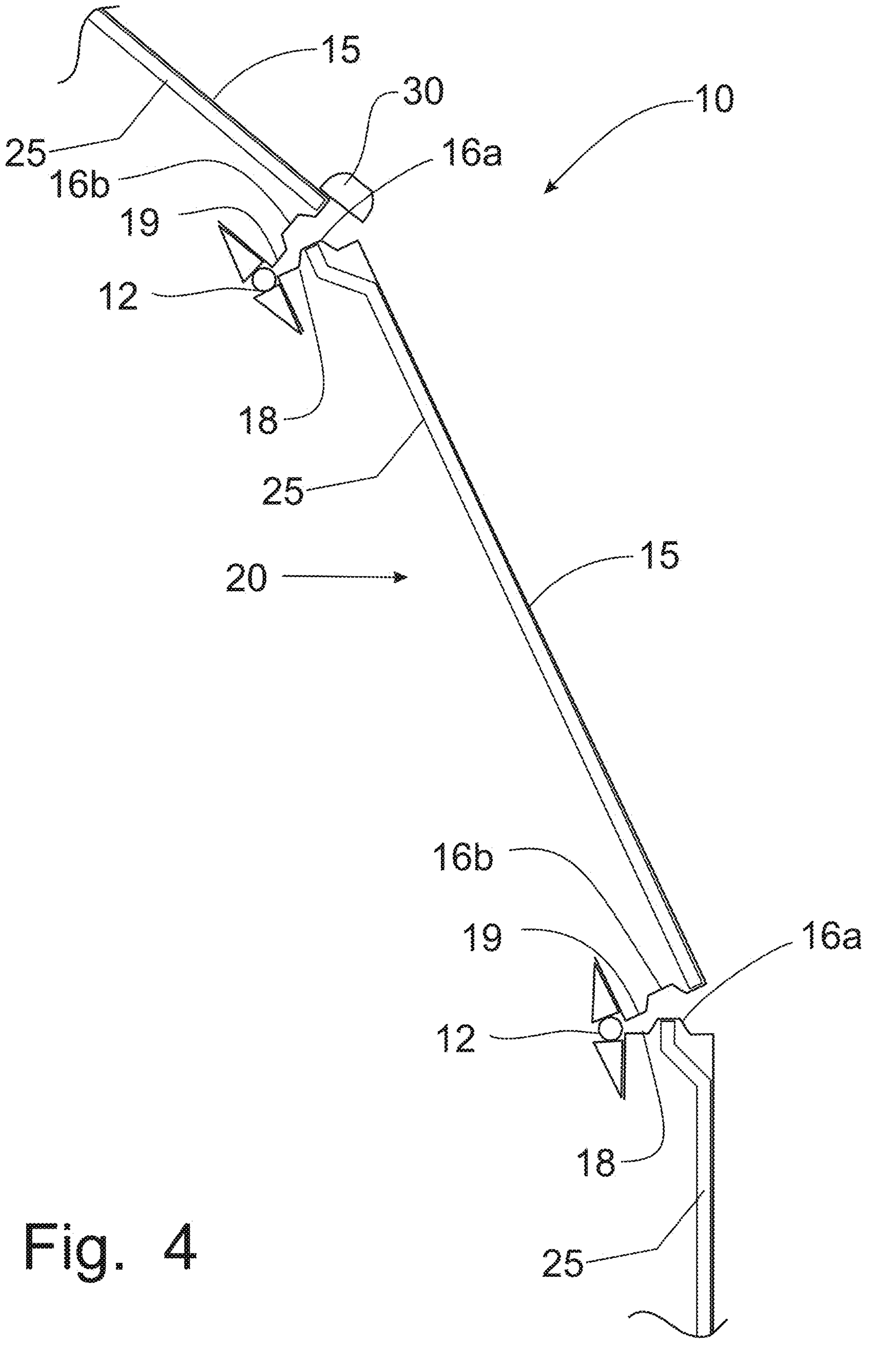
FIG. 4 is an enlarged cross-sectional view of the bullet resistant garage door depicted in FIG. 2 showing the orientation of the garage door panels being raised, or lowered, relative to the garage door opening.
Figure 7:
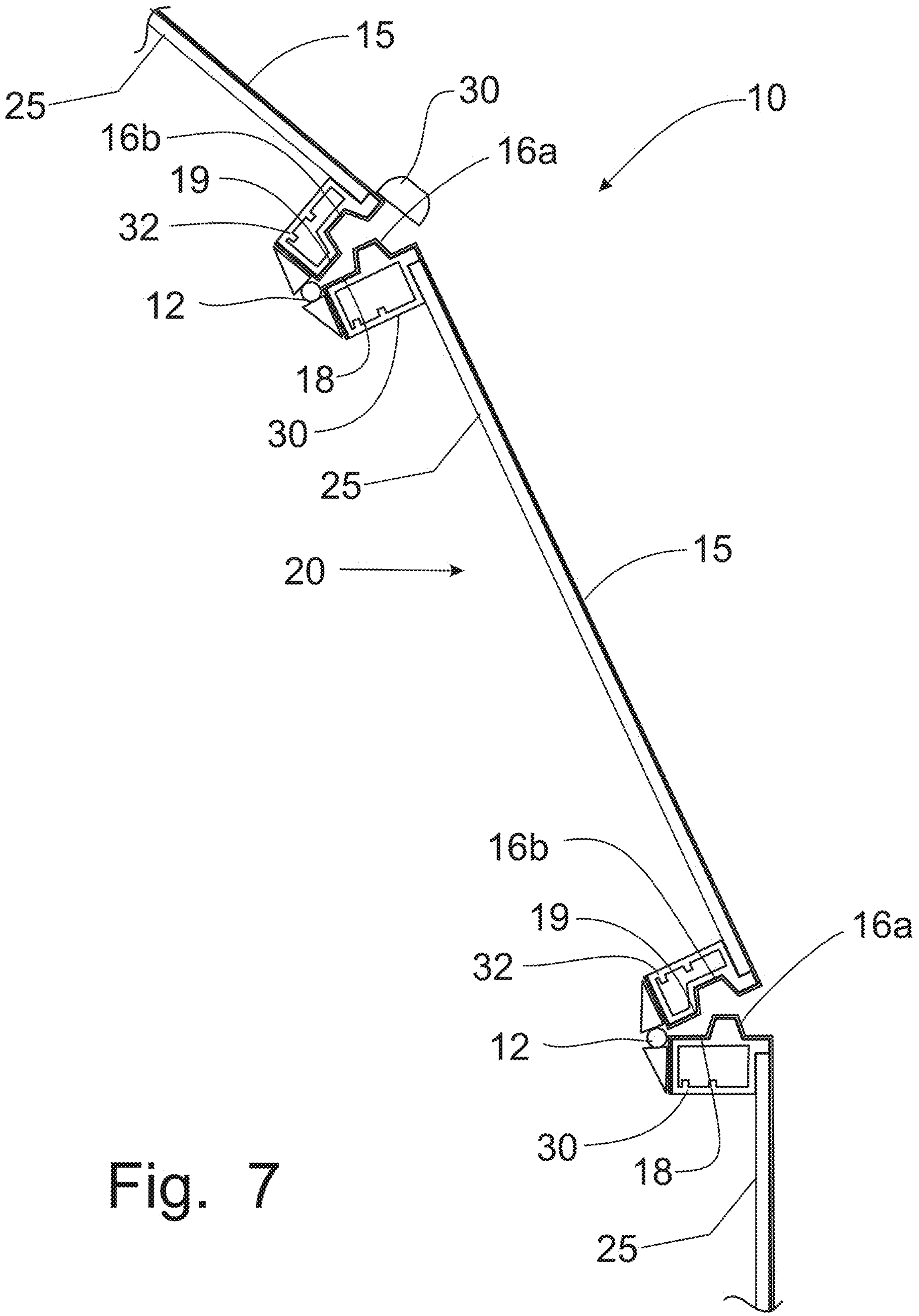
FIG. 7 is an enlarged cross-sectional view of the bullet resistant garage door depicted in FIG. 5 showing the orientation of the garage door panels being raised, or lowered, relative to the garage door opening.

Referring to the drawings, two embodiments of a garage door formed with panel shells made from coil stock metal and transformed into a bullet resistant garage door by the installation of bullet resistant material secured to the interior surface of the shell, and incorporating the principles of the instant invention, can be seen. FIGS. 2-4 and 8 depicting a first embodiment of the bullet resistant panel shell formed from coil stock, and FIGS. 5-7 and 9 depicting the second embodiment of the bullet resistant panel shell formed from coil stock. In general, the garage door 10 is formed from a plurality of horizontally extending panels 15 that are hinged together by hinges 12 to allow the respective panels 15 to pivot relative to one another, as is depicted in FIGS. 4 and 7, to permit raising and lowering of the garage door 10 relative to the opening covered by the garage door 10. Also, as is shown in FIG. 1, the garage door 10 is typically formed with a conventional elastomeric seal 16 along the bottom edge to seal the garage door 10 against the lower surface of the garage structure (not shown) as is known in the art. The kit 30, best seen in FIGS. 8 and 9, is applied to the interior side of the conventional garage door panels 15 such that the outward aesthetic appearance of the garage door 10 is not significantly changed.

Each conventional garage door panel 15 is formed from coil stock (not shown), which is a thin (usually 50/1000 of an inch) panel of sheet metal (not shown), usually steel, but could also be aluminum, that is rolled into a coil for ease of transport and disbursement. The coil of sheet metal is mounted onto a dispenser that rotatably supports the coil of sheet metal for unwrapping from the coil configuration as the sheet metal is dispensed for manufacturing purposes. The sheet metal, once disbursed from the coil is flattened through rollers, then cut into appropriate lengths to be bent by presses into a desired shape. In the case of the panel shells 15 used in the fabrication of a garage door incorporating the principles of the instant invention, are shaped as shown in cross-section in FIGS. 8 and 9, respectively.

Panel shells 15 formed from coil stock are typically put through a manufacturing process that imprints a design on the exterior face of the panel shells 15, which with an appropriate application of paint or other coating material will make the panel shells 15 look like something that the panel shells 15 are not, such a wood or other desirable materials. The metal panel shells 15 have upper and lower ends 18, 19 extending generally perpendicular to a front face portion 17. The upper and lower ends 18, 19 are formed into mating wedge-shaped members 16, with one wedge-shaped member being convex 16*a* and the mating wedge shaped member being concave 16*b*. As will be understood by one of ordinary skill in the art, panel shells 15 formed from coil stock are not very resistant to the passage of bullets therethrough into the interior of the garage structure. According to the principles of the invention, bullet resistant layers are applied to the interior surface of the panel shells 15 to provide the desired level of bullet resistance.

Referring first to the embodiment depicted in FIGS. 2-4 and 8, the first embodiment of the panel shells 15 are transformed into a bullet resistant garage door panel by applying a ballistic insert 20 to the interior side of the panels 15. This ballistic insert 20 is preferably a sheet 25 of compressed multiple plies of bullet resistant fabric that are highly compressed to create a ballistic barrier at a desired level. The higher the level of resistance is desired; the more plies of ballistic fabric are included into the compressed strata. Alternatively, the ballistic insert 20 can include other ballistic materials, such as hardened resin that can be molded to mate with the panel shells 15, or other materials that provide the same ballistic characteristics as the compressed ballistic fabric 25. The panel shell 15 is preferably secured to the ballistic insert 20 by very high bonding adhesive tape, such as (VHB) adhesive tape, or other suitable adhesives. The ballistic insert 20 is preferably manufactured and assembled offsite and applied to the interior side of the panel shell 15.

Accordingly, the panel shells 15 can be transformed into bullet resistant panel shells 15 at the manufacturing site for the panel shells 15 or the garage door 10 by applying the ballistic insert 20 to the interior side of the panel shells 15. Alternatively, existing garage doors formed by panel shells 15 made from coil stock and already installed on a garage structure (not shown) can be converted into bullet resistant garage door panel shells 15 by installing the ballistic inserts 20 with appropriate adhesive provided as a transformation kit that includes the ballistic inserts 20 and adhesive.

Referring now to FIGS. 5-7 and 9, the second embodiment of a bullet resistant garage door formed with coil stock panels 15 can best be seen. The panel shells 15 are formed in the same manner as the panel shells 15 in the first embodiment, i.e. from coil stock metal. Hinges 12 connect adjacent panel shells 15 to permit pivotal movement of the panel shells 15 about the hinge 12 pivot axis, which permits a raising and lowering of the garage door 10 as reflected in FIG. 7. Bullet resistant members 30, 32, preferably formed as extrusions from 6063 aluminum and presenting an enhanced resistance to the passage of bullets are the joint between two adjacent panel shells 15, as is reflected in FIG. 7. Preferably, a ballistic insert 20 is attached to the interior side of the panel shells 15 extending between opposing bullet resistant members 30, 32 for each respective panel shell 15. As noted above, the ballistic insert can be formed from a number of different materials, but preferably compressed multiple plies of ballistic fabric, having an appropriate thickness for the level of bullet resistance that is desired.

The component parts of the bullet resistant garage door 10 are shown in the exploded view of FIG. 9. Accordingly, the extrusions 30, 32 and the ballistic inserts 20, with appropriate adhesive included, would comprise a kit that could be used to convert a standard metal panel garage door into a bullet resistance garage door 10. The extrusions 30, 32 can be sized and shaped in advance to fit the existing garage door panels, and secured at the top and bottom of each panel shell with the adhesive. The ballistic insert 20 can then be secured with the adhesive to the interior side of the garage door panel between the two corresponding extrusions 30, 32, to create a bullet resistant garage door 10.

Level 3 and Level 8 bullet resistance can be attained through the choice of materials and the thickness thereof for the ballistic inserts in either the first or second embodiments, as well as the material and wall thicknesses of the extrusions for the second embodiment incorporating the principles of the instant invention. The utilization of the instant invention can be incorporated into the manufacturing of the garage door panels, or be applied to existing conventional garage doors as a kit to convert the conventional garage door into a bullet resistant garage door. One skilled in the art will recognize that the Level 3 garage door 10 is capable of stopping small caliber bullets, such as from 9 mm and .357 caliber hand guns, and even shotguns by using five-sixteenths wall thickness of the 6063 aluminum extrusions 30, 32, along with appropriate thickness of the ballistic insert 20 for the second embodiment, or just appropriate thickness of the ballistic insert 20 for the first embodiment. Level 8 bullet resistant garage door panels would require five-eighths inch wall thickness of the 6063 aluminum extrusions 30,32, in addition to a similar increased thickness of the ballistic insert for the second embodiment. Similarly, the first embodiment would require increased thickness of the ballistic insert 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. For example, 6061 aluminum material can be substituted for the preferred 6063 aluminum material used in the interior and exterior aluminum panels 21-24; however, material thicknesses may require adjustment to maintain the desired bullet resistance capability.

For example, an optional exterior barrier 30 associated with each of the joints can be added to the exterior surface of the front face member 17 to enhance bullet resistance of the joint between adjacent metal shell panels 15. Such a barrier 30 is shown at one of the joints in FIGS. 4 and 7, and is particularly preferably for higher levels of bullet resistance.

Having thus described the invention, what is claimed is:

1. A kit for transforming a conventional garage door having multiple metal shell panels connected by hinges interconnecting adjacent metal shell panels into a bullet resistant garage door, comprising:

a ballistic insert for attachment to an interior side of each said metal shell panel, said ballistic insert being sized to extend from an upper end of each said metal shell panel to a bottom end of each respective said metal shell panel;

an upper joint insert and a mating lower joint insert for attachment to each said metal shell panel along upper and lower ends thereof; and a high bonding adhesive for securing said ballistic insert to said metal shell panel.

2. The kit of claim 1 wherein each said joint insert is formed from 6063 aluminum material.

3. A kit for transforming a conventional garage door having multiple metal shell panels connected by hinges interconnecting adjacent metal shell panels into a bullet resistant garage door, comprising:

a ballistic insert for attachment to an interior side of each said metal shell panel, said ballistic insert being sized to extend from an upper end of each said metal shell panel to a bottom end of each respective said metal shell panel;

a high bonding adhesive for securing said ballistic insert to said metal shell panel; and a barrier for mounting on an exterior side of each said metal shell to cover a joint between said metal shell panel and a lower adjacent metal shell panel.

4. The kit of claim 1 wherein said upper and lower joint inserts include a mating wedge configuration.

5. The kit of claim 4 wherein said ballistic insert comprises:

multiple layers of ballistic fabric compressed into a sheet.

6. A method of converting a conventional garage door having a plurality of metal shell panels hinged together, comprising the steps of:

securing a ballistic insert having a desired thickness to an interior surface of each said metal shell panel to provide the desired level of bullet resistance and having a length that will extend from an upper end of said metal shell panel to a corresponding lower end of said metal shell panel, said ballistic insert extending into a convex wedge-shaped member to provide bullet resistance of a hinged joint between adjacent metal shell panels.

7. The method of claim 6 further comprising the step of:

installing an upper joint insert and a mating lower joint insert for attachment to each said metal shell panel along upper and lower ends thereof, said joint inserts formed with a convex wedge-shaped member and a mating concave wedge-shaped member to conform with corresponding shapes of said metal shell panels; and positioning said ballistic insert along said interior side of each said metal shell panel from the upper joint insert to the corresponding lower joint insert.

8. The method of claim 7 wherein each joint insert is formed from 6063 aluminum.

9. The method of claim 6 further comprising the step of:

forming said ballistic insert by compressing multiple layers of ballistic fabric into a single sheet of material.

10. The method of claim 6 wherein said ballistic inert is formed from one of hardened ballistic resin or bullet resistant metal, sized in thickness to provide a desired level of bullet resistance.

11. The method of claim 6 wherein said securing step includes:

using a high bond adhesive tape to secure the ballistic insert to said interior surface of said metal shell panels.

12. A garage door having multiple metal shell panels hinged together, comprising:

each metal shell panel being formed from coil stock and defining mating concave and convex wedge members at the upper and lower ends of the metal shell panel, said upper and lower ends being extending generally perpendicular to a front face portion; and a ballistic insert extending between said upper and lower ends and secured to an interior side of said front face portion.

13. The garage door of claim 12 wherein said ballistic insert extends into said convex wedge member so as to extend below said front face portion.

14. The garage door of claim 12 further comprising:

a first joint insert installed at said upper end of each said metal shell panel;

a second joint insert installed at said lower end of each said metal shell panel, said second joint being oriented to mate with the first joint insert of the adjacent metal shell panel; and said ballistic insert extending along said interior side of said front face portion between said first and second joint inserts.

15. The garage door of claim 14 wherein said ballistic insert is formed from one of the following: compressed multiple plies of ballistic fabric, hardened ballistic resin and 6063 aluminum.

16. The garage door of claim 15 wherein the thickness of the ballistic insert, and the wall thickness of the first and second joint inserts are a function of the desired level of bullet resistance.

* * * * *